United States Patent [19]

Nankou et al.

[11] Patent Number: 5,771,048

[45] Date of Patent: Jun. 23, 1998

[54] FONT CONVERSION DEVICE

[75] Inventors: Takahiko Nankou, Nishinomiya; Haruo Yamashita, Osaka, both of Japan

[73] Assignee: Matsushita Electric Industrial Co., Ltd., Osaka, Japan

[21] Appl. No.: 9,877

[22] Filed: Jan. 27, 1993

[30] Foreign Application Priority Data

Jan. 27, 1992 [JP] Japan ................................ 4-011676

[51] Int. Cl.$^6$ .................................................. G06T 11/40
[52] U.S. Cl. ........................................................ 345/471
[58] Field of Search .................................. 395/150, 128; 358/455, 456, 451, 458; 382/264; 345/471

[56] References Cited

U.S. PATENT DOCUMENTS

| | | | |
|---|---|---|---|
| 4,720,705 | 1/1988 | Gupta et al. | 345/20 |
| 4,851,825 | 7/1989 | Naiman | 345/132 |
| 4,885,576 | 12/1989 | Pennebaker et al. | 345/147 |
| 4,910,603 | 3/1990 | Hirahara et al. | 358/457 X |
| 5,029,107 | 7/1991 | Lee | 395/131 |
| 5,101,443 | 3/1992 | Behrmann-Poitiers | 382/299 |
| 5,109,282 | 4/1992 | Peli | 358/458 X |
| 5,148,289 | 9/1992 | Nishiyama et al. | 358/300 |
| 5,159,644 | 10/1992 | Martin et al. | 382/161 |
| 5,239,383 | 8/1993 | Ikeda et al. | 358/448 X |
| 5,243,668 | 9/1993 | Kitamura et al. | 382/264 X |
| 5,245,444 | 9/1993 | Hashimoto | 358/445 |
| 5,257,116 | 10/1993 | Suzuki | 358/465 |
| 5,333,212 | 7/1994 | Ligtenberg | 382/264 X |
| 5,339,365 | 8/1994 | Kawai et al. | 382/264 X |

FOREIGN PATENT DOCUMENTS 62-286753   12/1987   Japan.
1-270094    10/1989   Japan.

OTHER PUBLICATIONS

Foley et al., Computer Graphics: Prinicples and Practice, 1990, p. 965–979, 1990.
Foley et al., Computer Graphics: Principle and Practice, 1990, pp. 126–141, 564–567, 617–645.
Ju et al., Clobal Study on Data Compression Techniques for Digital Chinese Character Patterns, IEEE Proc. Part E Computers & Digital Techniques, Jan. 1992, pp. 1–8.
Schilling et al., A New Simple and Efficient Antialiasing with Subpixel Masks, Computer Graphics, Jul. 1991, pp. 133–141.
Wu, An Effiecient Antialiasing Technique, Computer Graphics, Jul. 1991, pp. 143–152.
Kirk et al., Unbiased Sampling Techniques for Image Synthesis, Computer Graphics, Jul. 1991, pp. 153–156.

Primary Examiner—Anton Fetting
Attorney, Agent, or Firm—Ratner & Prestia

[57] ABSTRACT

A font data output method that applies bandwidth limitation to binary font data using a two-dimensional low-pass filter, and applies gain of one or more to a multilevel-value data group obtained by reduction at a predetermined ratio according to the distribution of values in the multilevel-value data group to generate the gradated font data. Using this method, the loss of line and character density in the font data due to a high reduction ratio can be prevented.

20 Claims, 9 Drawing Sheets

| | | 0.11 | 0.66 | | | | |
|---|---|---|---|---|---|---|---|
| | 0.33 | 0.33 | 0.88 | 0.66 | 0.33 | | |
| | | 0.33 | 0.22 | 0.33 | | | |
| | | 0.44 | 0.33 | 0.77 | 0.33 | 0.11 | |
| | 0.22 | 0.44 | 0.22 | 0.22 | | 0.66 | |
| 0.11 | 0.22 | 0.33 | 0.33 | | | 0.11 | 0.11 |
| 0.33 | 0.11 | 0.33 | 0.44 | | | 0.66 | |
| 0.22 | 0.44 | | 0.22 | 0.11 | 0.33 | 0.33 | |

| | | 0.17 | 1.0 | | | | |
|---|---|---|---|---|---|---|---|
| | 0.50 | 0.50 | 1.0 | 1.0 | 0.50 | | |
| | | 0.50 | 0.33 | 0.50 | | | |
| | | 0.66 | 0.50 | 1.0 | 0.50 | 0.17 | |
| | 0.33 | 0.66 | 0.33 | 0.33 | | 1.0 | |
| 0.17 | 0.33 | 0.50 | 0.50 | | | 0.17 | 0.17 |
| 0.50 | 0.17 | 0.50 | 0.66 | | | 1.0 | |
| 0.33 | 0.66 | | 0.33 | 0.17 | 0.50 | 0.50 | |

FONT CONVERSION DEVICE

BACKGROUND OF THE INVENTION

1. Field of the Invention

The present invention relates to a font conversion device for outputting fonts in a high readability state to a low resolution computer display or video printer, and more particularly, to a font conversion device for converting a font whose pixels having binary values to a font whose pixels having multilevel values.

2. Description of the Prior Art

Printers, displays, and other computing peripherals that take a digital signal input and can output a variable gradation (gray scale or color) image of text and/or graphics are commonly available today. Virtually all of the font data processing devices output text and symbols of binary fonts for textual expression. Characters generated in binary font data inevitably have jagged components on diagonal and curved lines in the characters, and the output is often inferior in quality.

A method attempting to resolve this problem filters the binary fonts through a two-dimensional low pass filter and then selectively extracts data bits to reduce the characters and output a gradated font, and such a method is proposed by Japanese Laid-open Patent Publication No. H1-270094.

With this method, however, when the reduction rate is increased to output even smaller characters,: character density becomes low and contrast drops. As a result, the readability of the output characters is not noticeably improved.

This is described below for two common cases: reducing a 24×24 dot binary font by one-half vertically and horizontally to output a gradated 12×12 dot font, and reducing this font to ⅓ vertically and horizontally to output a gradated 8×8 dot font. The 24×24 dot source font used in this operation is shown in FIG. 3, and each of square calls shown therein represents each pixel of the source font.

The first case, reduction by one-half to a gradated 12×12 dot font, is described first. The two-dimensional low-pass filter used in this operation is the 2×2 matrix shown in Table 1.

TABLE 1

| | |
|---|---|
| 0.25 | 0.25 |
| 0.25 | 0.25 |

After passing the 24×24 dot binary source font shown in FIG. 3 through this two-dimensional low-pass filter, the output is picked to extract half of the dots vertically and horizontally, resulting in a 12×12 dot gradated character, as shown in FIG. 14. The output pixel values of this gradated font is reduced at a 50% reduction ratio.

The values in FIG. 14 indicate the density of each pixel therein, where no value means the minimum pixel density or white and where one means the maximum pixel density or black.

A 3×3 matrix as shown in Table 2 is used for the low-pass filter to reduce the source font to ⅓.

TABLE 2

| | | |
|---|---|---|
| 0.33 | 0.33 | 0.33 |
| 0.33 | 0.33 | 0.33 |
| 0.33 | 0.33 | 0.33 |

After passing the 24×24 dot binary source font through this two-dimensional low-pass filter, the output is picked to extract one-third of the dots vertically and horizontally, resulting in an 8×8 dot gradated character. The output pixel values of this gradated font at a 33% reduction ratio are shown in FIG. 4.

Comparing the values shown in FIG. 4 with those in FIG. 14 for the 50% reduced character output, we find that the density of most of the pixels of character shown in the FIG. 4 is less than half of the maximum pixel density. When the corresponding gradated characters are output to a display or printer, the text has a very low density and contrast, and is accordingly hard to read.

When 12×12 dot gradated text is displayed together with 8×8 dot gradated text on a single display, the density of the 8×8 dot text becomes extremely low and overall readability is poor.

Because no correction by CRTS (cathode ray tubes) nor other output devices are made to compensate for nonlinear variations in display luminosity, gradation information resulting from this filtration process is not output in the form offering the highest readability.

SUMMARY OF THE INVENTION

The present invention has been developed with a view to substantially solving the above described disadvantages and has for its essential object to provide an improved font conversion device.

In order to achieve the aforementioned objective, a font conversion device for converting a binary font data formed by pixels each having binary value by applying a bandwidth limitation according to a predetermined reduction rate into a reduced font data formed by pixels each having multilevel values, said device comprising: a source font means for sequentially providing font data of predetermined areas of said binary font data, said predetermined area including a predetermined number of pixels; a spatial operation means for reducing said binary font data by applying a low pass filtering to said binary font data read out from said predetermined areas to produce a plurality of multilevel-value font data, each of said multilevel-value font data representing a single pixel of said reduced font data; a gradation correction means for applying a predetermined gain to said plurality of multilevel-value data to enhance a dynamic range thereof and to produce an enhanced font data; and a control means for controlling each means of said font conversion device.

BRIEF DESCRIPTION OF THE DRAWINGS

Those and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 3:
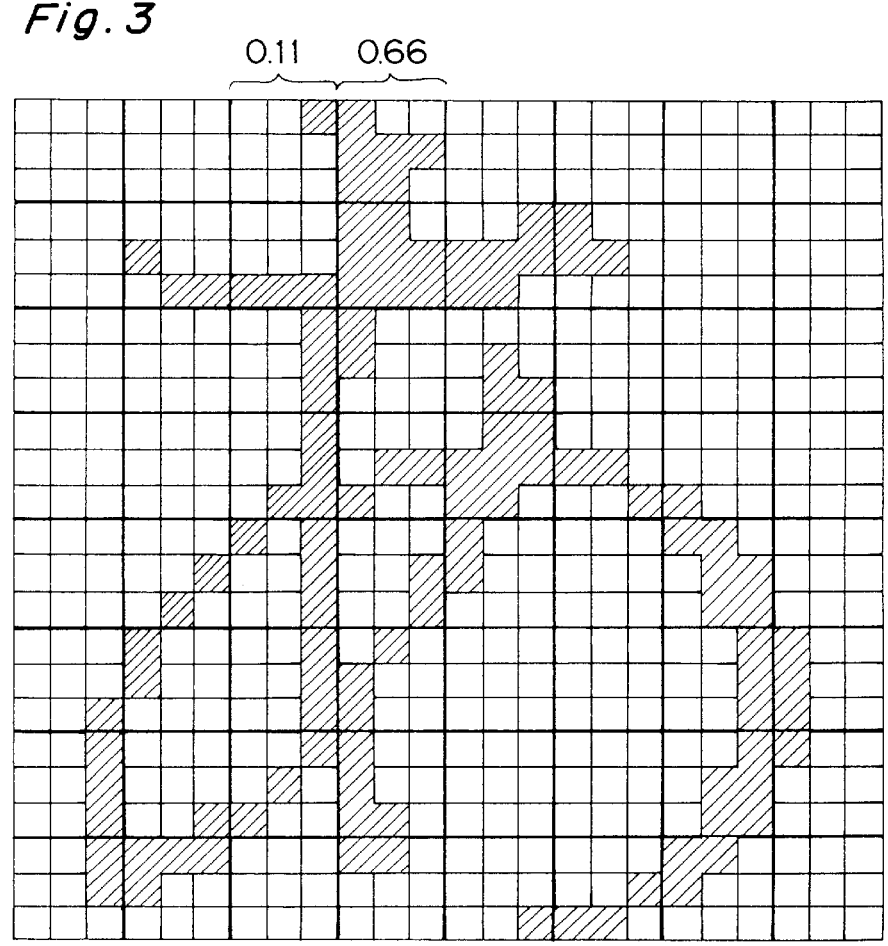
FIG. 3 is a graph of a single character, Japanese character "あ", depicted in a typical 24×24 dot font.

The font conversion device according to the present invention is described below with reference to the case in which a source font formed by, for example, 24×24 dot font is reduced to one-half, one-third, and one-fourth to produce an 12×12 dot, 8×8 dot, and 6×6 dot gradation fonts, respectively. As one example of the binary source font, Japanese character "あ" of 24×24 dot is shown in FIG. 3, in which square cells each representing a single pixel are provided to form dot matrix for a single character. The cell can have only binary value so that the pixel can take either 100% density or 0% density relatively to the signal "1" or "0", respectively, applied to each other. In FIG. 3, the shaded and non-shaded cells of the font matrix cells indicate 100% of density and 0% of density pixels, respectively. Thus, the shaded cells (pixels) form a character pattern of "あ", and non-shaded cells form the background. Hereinafter, the source font is referred to as a "binary source font".

Figure 1:
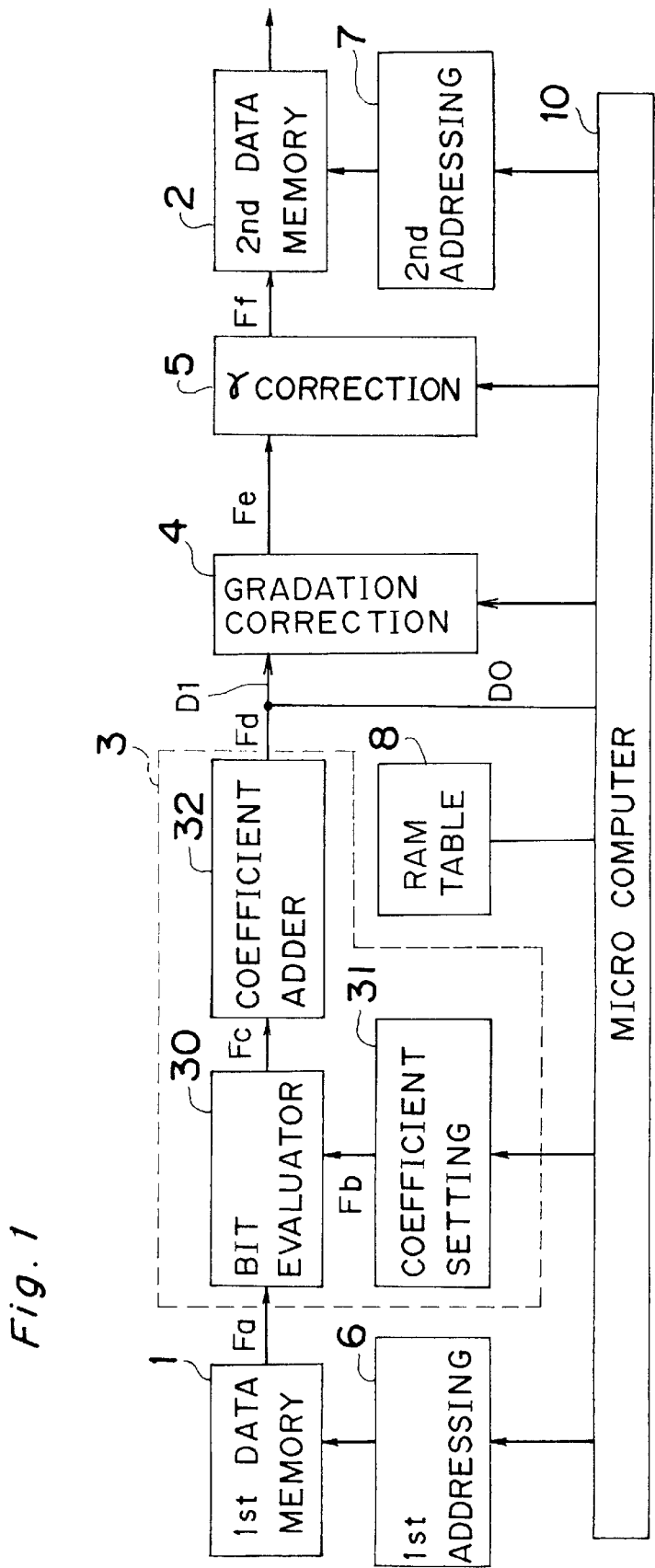
FIG. 1 is a block diagram of a font conversion device according to a preferred embodiment of the present invention.

Referring to FIG. 1, a block diagram of a font conversion device according to the present embodiment is shown. The font conversion device comprises a data memory 1, a second data memory 2, a spatial operator 3, a first gradation correction unit 4, a gamma correction unit 5, a first addressing unit 6, a second addressing unit 7, a RAM table 8, and a microcomputer 10. Those are connected to each other, as shown in FIG. 1.

The first data memory 1 is comprised of a font ROM for storing binary font data Fa representing a plurality of binary source fonts supplied thereto, and having 16-bit output terminals a0 to a15 (shown in FIG. 8) for outputting data representing sixteen pixels therefrom. The first addressing unit 6 set the read address of the first data memory 1 for reading out a predetermined area of the binary font data Fa therefrom. The spatial operator 3 includes: a bit evaluator 30 for evaluating a bit of each pixel in the binary font data Fa based on predetermined coefficient values Fd and outputting a bit of evaluated data Fc; a coefficient setting unit 31 for setting the coefficient values Fb for the bit evaluator 30; and a coefficient adder 32 for adding the coefficient data Fc and producing a multilevel pixel data Fd. The spatial operator 3 reduces the binary font data Fa to one-third by applying the two-dimensional low-pass filter operations and generates a multilevel font data Fd which will be described later with reference to FIG. 4.

The gradation correction unit 4 adds gain to the multilevel font data Fd and produces a gradation corrected font data Fe.

The gamma correction unit 5 is comprised of a ROM table storing a plurality types of gamma characteristics for selectively applying to the gradation corrected multilevel font data Fe and produces a final multilevel font data Ff.

The second data memory 2 comprised of an image memory, for example a video RAM used in computers, stores the final multilevel font data Ff. The second data memory 2 can store 8-bit data of a single pixel and output the data with two hundred fifty six gradation.

The second addressing unit 7 sets the write address of the second data memory 2 for storing the final multilevel font data Ff.

The RAM table 8 is comprised of sixteen tables each having 16-bit length for storing results of number of pixels having the same density of the multilevel font data Fd. The microcomputer 10 determines the gradation characteristics of the multilevel pixel data Fd received through a signal line D0 and controls the operation of the font conversion device.

Figure 8:
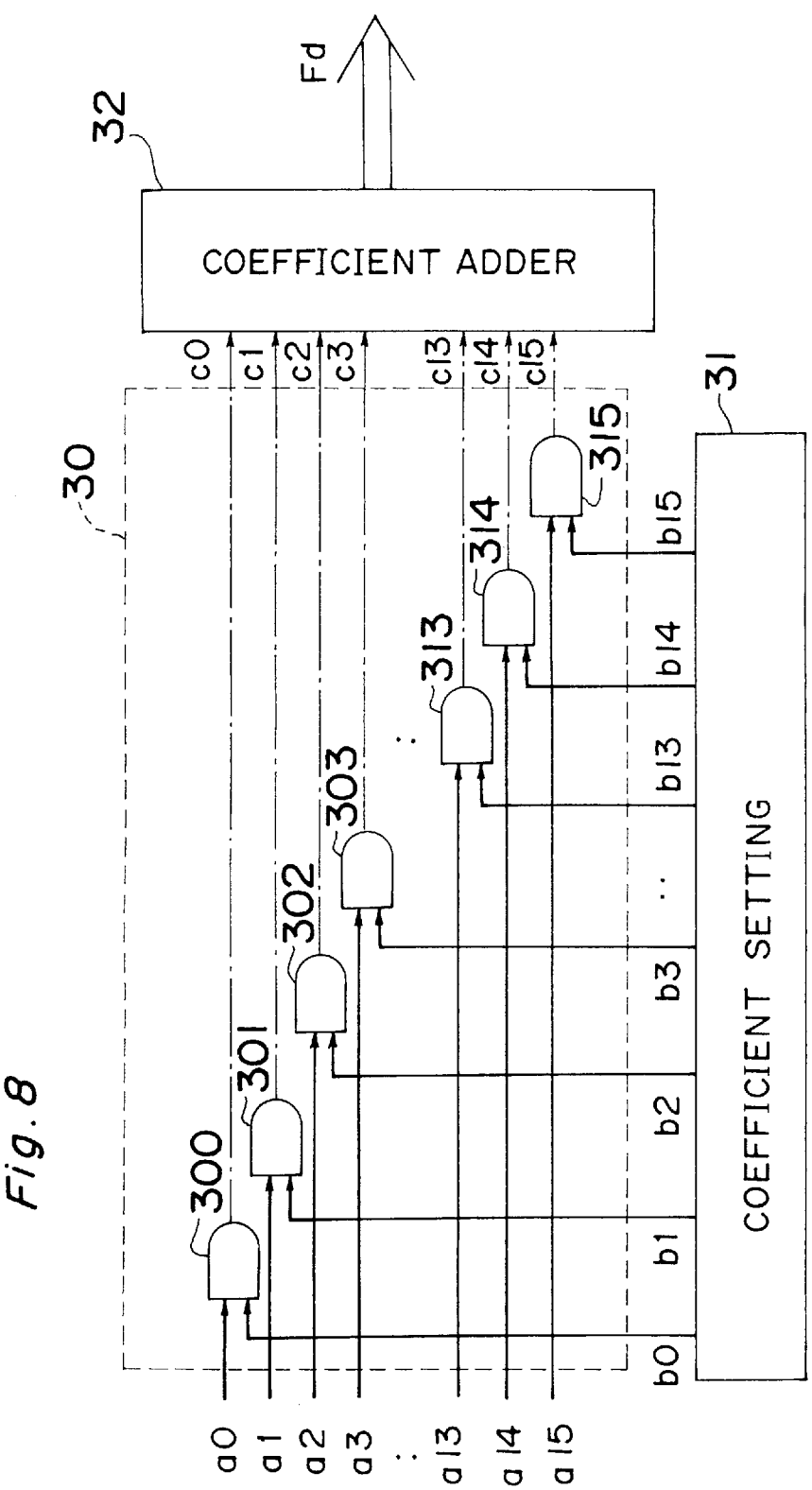
FIG. 8 is a block diagram showing the spatial operator shown in FIG. 1.

Referring to FIG. 8, the detailed construction of the spatial operator 3 is shown. The bit evaluator 30 includes sixteen of AND-gates 300 to 315 coupled to the 16-bit output terminals a0 to a15, respectively, for each receiving a single bit of font data read from the first data memory 1. The coefficient setting unit 31 is composed of a 16-bit latch having sixteen of output terminals b0 to b15 coupled to the AND-gates 300 to 315, respectively, for sending single bit coefficient data Fb. Thus, each of AND-gatas 300 to 315 produces a binary signal Fc based on corresponding bit data Fa and Fb from the first data memory 1 and the coefficient setting unit 31. The coefficient adder 32 includes sixteen of input terminals c0 to c15 coupled to the AND-gates 300 to 315, respectively, for receiving the binary signals Fc therefrom and adds the received binary signals FC to produce a multilevel pixel data Fd representing a single pixel.

Figure 2A:
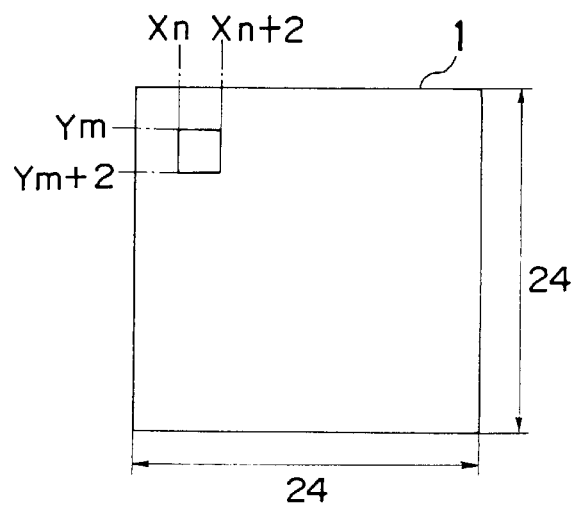
FIGS. 2a and 2b are illustrations of assistance in explaining the font conversion concept according to the present invention.
Figure 2B:
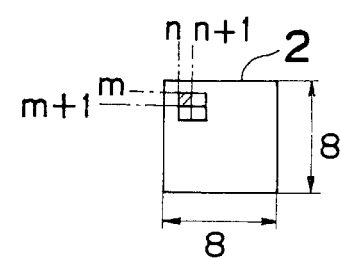

Referring to FIGS. 2a and 2b, the concept of reducing the binary source font in 24×24 dot matrix to the multilevel font data, for example, in 8×8 dot matrix is shown. The binary source font data Fa representing a single Japanese character "あ" is stored in the 24×24 bit font matrix of the first data memory 1, as shown in FIG. 3. Each bit represents a single pixel of the single binary source font Fa. In FIGS. 2a and 2b, the font matrix of first and second data memories 1 and 2 schematically depicted, respectively. The position of the pixels in those matrixes can be expressed by the coordinates (Xn, Ym) and (n, m), respectively. "Xn" and "Ym" are integers within the range of 0 to 21. "n" and "m" are integers within the range of 0 to 7, in which Xn and Ym are expressed as Xm=3×n and Ym=3×m.

At the font conversion process, 9 bits of binary source font data F stored in 3×3 pixel area, in the positions of (Xn, Ym) to (Xn+2, Ym+2), of the first data memory 1 are reduced by the spatial operator 3 to a single dot data of the multilevel font data Fd. This single dot data Fd is successively processed by the gradation correction unit 4 and the gamma correction unit 5. Then, a single dot data of the final multilevel font date Ff is produced and stored in a single bit which can be expressed by the coordinates (n, m) of the font matrix of the second data memory 2, as shown in FIG. 2b. After the first 9 bits of binary font data F, the next 9 bits corresponding to the area from (Xn+3, Ym) to (X+5,Ym+2)

are reduced and written to the next single bit (n+1, m). The first and second 9 bits are located on the same position with respect to the Y axis of the matrix.

Thus, binary source font data of the 24×24 dot font matrix of the first data memory 1 are divided into sixty four areas each including 8×8 of 9-bits blocks. These sixty four area of blocks are successively reduced by block by block from the left to the right, and line by line from the top to the bottom when view in FIG. 2a. Since a single dot data Ff is produced from a single 9 bits-block and is written in a single bit of matrix of the second data memory 2, the binary source font data of 24×24 dot font data F are reduced to 8×8 dots of font data Ff and written into the 8×8 dot matrix of the second data memory 2.

Hereinafter, the font conversion operation by the font conversion device according to the present inversion is detailedly described. The font conversion operation includes two steps: First step is for examining the gradation characteristics of the multilevel font data Fd for determining the desirable gradation correction characteristics, which will be referred to as "gradation characteristics determination step". Second step is for performing the gradation correction of the multilevel font data Fd with the desirable gradation characteristics determined by the first step to produce the gradation corrected multilevel font data Fe, which will be referred to as "font generation step".

First Step: Gradation Characteristics Determination Step

At this step, the gradation characteristics of multilevel data Fd is examined. With reference to FIG. 1, the operation of the spatial operator 3 is described.

The micro computer 10 controls the first addressing unit 6 to output the coordinates (n, m) of the read address of the first data memory 1 for reading out 9-bit data corresponding to 3×3 pixel area of the binary source font data Fa. Each bit of 9-bit data is sent to the AND-gates 300 to 308 of the bit evaluator 30 through the output terminals a0 to a8, respectively. "0" bit data are sent through the output terminal a9 to a15. It is to be noted that when the binary source font is reduced to ¼, 16-bit data corresponding to 4×4 pixel area are read out and sent to the bit evaluator 32 through the output terminals a0 to a15.

The micro computer 10 controls the coefficient setting unit 31 to set the bit values output therefrom based on the values employed by the low-pass filter shown in Table 2. In this case, the coefficient setting unit 31 outputs "1" bit data from the terminals b0 to b8 and "0" bit data from the terminals b9 to b15. The output from the AND-gates 300 to 308 vary "1" or "0" according to the bit data from the terminal a0 to a9, while the output from the AND-gates 309 to 315 are "0". Therefore, the added value by the coefficient adder 32 also varies from 0 to 9 according to the font bit pattern of the 3×3 pixel area of the dot matrix. In this case, values "0" and "9" represent the minimum and maximum density of multilevel bit signal Fd.

The nine of coefficient value shown in Table 2 are usually employed for the two-dimensional low-pass filter to reduce the image data to one-third. Generally speaking, for reducing the image data to 1/N, N×N number of coefficients which value is $1/N^2$ each.

Next, the micro computer 10 controls the first addressing unit 6 to output the coordinates (n, m) of the second data memory 2 address. According to this coordinates (n, m), the first addressing unit 6 output the address (Xn, Ym) in which Xn and Ym are expressed as Xm=3×n and Ym=3×m.

The pixel data Fa from the nine bit address range (Xn, Ym) to (Xn+2, Ym+2) in the first data memory 1 is read out to the bit evaluator 30 of the spatial operator 3. The bit evaluator 30 performs the bit evaluation of the pixel data Fa based on the coefficient data from the coefficient setting unit 31 and outputs the evaluated pixel data Fc. The coefficient adder 32 adds the evaluated pixel data Fc to produce a single of multilevel bit date Fd having an information indicating the number of pixels which is not white or zero.

The micro computer 10 reads thus obtained multilevel bit data Fd through the signal line D0 and adds one to the value in one of seventeen tables of the RAM table 8 which is indexed by the multilevel bit data Fd. The RAM table 8 includes seventeen entries. The number of entries used is expressed by the equation of (N×N)+1, in which N represents an inverse number of the reduction ratio of the converted font. In this embodiment, the number of entries is the same as the number of possible values of multilevel data Fd obtained by processing the 9-bit data Fa. Now, when the reduction ratio is one-third (⅓) the multilevel data Fa can have ten of different values, 0, 1, 2, 3, 4, 5, 6, 7, 8, and 9. Each table is indexed by the value of the multilevel data Fd and indicative of how frequent the multilevel data Fd appears. This operation is repeated eight times with sequentially increasing one to the table at every operation, such as (n, m)=(0, 0), (1, 0), . . . , (8, 0). When "n" is eight, The operation for one line of is completed and "n" and "m" are reset to one and zero, respectively. Then, the next line is processed. This operation is repeated eight times until when "m" becomes 8. Thus, 8 cells×8 lines area is processed and sixty four of multilevel bit data Fd are obtained sequentially. The RAM table stores the appearance number with respect to each of multilevel bit data Fd. In the table 3, the appearance number of the multilevel data Fa which is obtained by processing the font data shown in FIG. 3.

TABLE 3

| Density | Appearance |
|---------|------------|
| 0.00 | 27 |
| 0.11 | 7 |
| 0.22 | 7 |
| 0.33 | 13 |
| 0.44 | 4 |
| 0.55 | 0 |
| 0.66 | 4 |
| 0.77 | 1 |
| 0.88 | 1 |
| 1 | 0 |

By applying the above described operation to all font data which will be output to the second data memory 2, an gradation characteristics of the font data to be output therefrom.

Figures 4, 5:
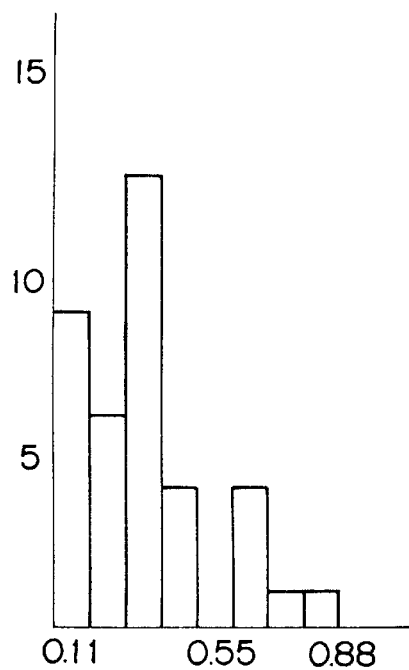
FIG. 4 is a table of density values at each pixel of the gradated font converted from the font of FIG. 3 at a ⅓ reduction ratio.
FIG. 5 is a graph showing the distribution of pixels with respect to the density in the font of FIG. 4.

Herebelow, a method for determining the gradation correction characteristics based on the multilevel data Fd obtained by reducing the font of FIG. 3 is described. Referring to FIG. 4, the table of pixel values in the gradated font converted from the font of FIG. 3 at a one-third reduction ratio is shown. Referring back to FIG. 3, the first 9 bits area shown on the left up corner of the font matrix are all zero, or white, the density of multilevel data Fd is zero (0/9). The second 9 bits area on the right to the first area are also zero. However the third 9 bits area on the right to the second area has only one pixel which is black. Therefore, the density of multilevel data Fa from this area is ⅑ or 0.11, as shown in FIG. 4. Furthermore, the fourth area has six of black pixels, resulting in the multilevel data Fa is 6/9 or 0.66.

Thus, values in every cell of FIG. 4 represents the average density of corresponding 9 bit area shown FIG. 3. The density of most of the pixels of character shown in FIG. 4 is less than half of the maximum density.

Referring to FIG. 5, the distribution of the non-zero density pixels in the data shown in FIG. 4 is shown. As shown in the pixel density is on the axis of abscissas, and the number of pixels of each density is on the axis of ordinates in FIG. 5. The maximum density is normalized to have the value of one in FIG. 5. The minimum pixel density $d_{min}$=0.11, and the maximum pixel density $d_{max}$=0.88. The gradation correction unit 4 determines the gain from this data distribution. These data indicating the number of pixels having same density are stored in ten of tables of the RAM table 8, such that the number of pixels having zero density is stored in the first table, the number of pixels having 0.11 density is stored in the second table, and likewisely.

Figure 6:
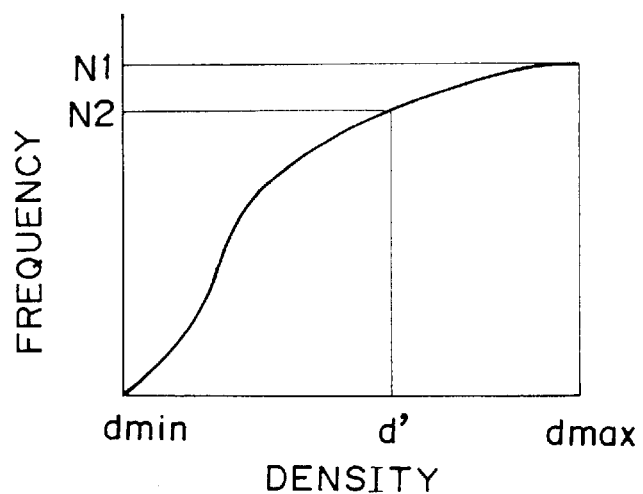
FIG. 6 is an ogive curve of the pixels with respect to the density in FIG. 4.

Referring to FIG. 6, an ogive curve of the pixel data of FIG. 5 is shown. The gradation correction unit 4 counts the cumulative frequency N2 of the pixels from $d_{cin}$ to $d_{min}$ which are shown in FIG. 5, defines the number of non-white, i.e., not zero, pixels as N1, and obtains a reference density d' which satisfy the relationship expressed by the equation of N2>Th×N1 (Th is a constant between 0.0 and 1.0). When a value near zero is employed as Th, the font data is well corrected its gradation to have high density. However, the constant Th is set at too small value, the font data is excessively corrected to degrade the readability thereof. When Th is set at one, the dynamic ranges of the font data and the font outputting device is the same. However, if the number of the multilevel bit data having the maximum density is small, the font character will have a low density. From these, Th is usually set at more than 0.5, and preferably set between 0.7 to 0.9. In this embodiment, Th set at 0.85 is used.

Figure 7:
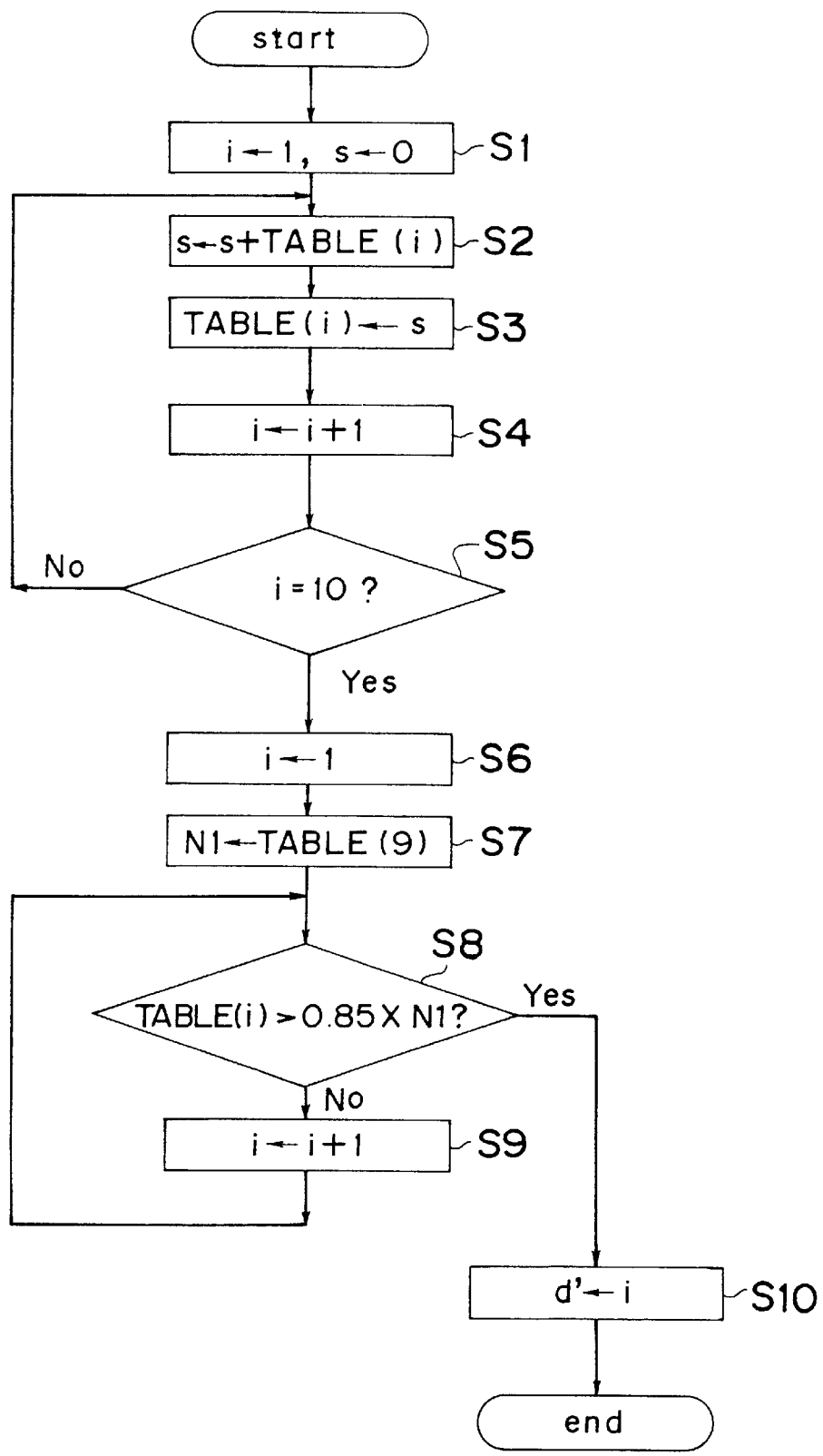
FIG. 7 is a flow chart of the operation for obtaining the ogive curve of FIG. 6, executed by the micro computer shown in FIG. 1.

Referring to FIG. 7, the operation of micro computer 10 to obtain the reference density d' is shown.

At step S1, when the operation starts, a counter i is set to one and an ogive variable s is set to zero. The ogive variable s represents the times of accumulating the pixels having the same density, for example 0.11 or likewise.

At step S2, the values stored in the "i"-th table of the RAM table 8 is added to the variable s. Since i is set to one at step S1, the value in the first table (i=1) which is the total number of pixels having the 0.11 density is added to the variable s (s=0). Then, the variable s is set to the value of the first table (i=1).

At step S3, the variable s having the value of first table (i=1) is stored in the first table (i=1).

At step S4, the counter i is incremented by one.

At step S5, it is judged whether the counter is ten or not. When the counter is ten, the operation advances to the next step S6.

But, if the counter i is not ten, the operation returns to step S2 where the variable s is set to the sum of values of the first table (1) and the second table (2). Then, the summed value of first and second tables is stored in the second table (2). The values of first table (1) and second tables (2) are accumulated as the variable s. Then, this accumulated value of table (1) and table (2) is stored in the second table (2) at step S3. And the counter i is incremented to three in step S4. This operation from step S2 to S4 is repeated until when the counter i is incremented to 10 at step S4, so that from the first to ninth table (i=1 to i=9) are set to the accumulated value of from the first table (1) to the current table (i) sequentially. It is to be noted that the ninth table (9) has the total accumulated number of pixels shown in FIG. 5, and which is the same as the number of non-white, not zero, pixels.

At step S6, the counter i is reset to one.

At step S7, N1 is set to the values of the ninth table (9) which is the total number of non-white pixels.

At step S8, it is judged whether the value of "i"-th table (i=1) is greater than 0.85×N1 or not. When it is judged "Yes", the operation advances to step S10 where the reference density d' is set to i. Thus, the reference density d' is obtained.

But, if it is judged "No" at step S8, the operation advances to step S9 where the counter i is incremented by one, and returns to step S8. At step S8, the value of next table (i=2) having the accumulated values of first and second table is compared with the value of 0.85×N1. Until when it is judged "Yes", the values of nine table (i=1 to 9) having sequentially accumulated value is examined to determine the reference density d'. In the present embodiment, the reference density d' is 6. When the reference density d' is normalized to fall within the range of 0.0 to 1.0, the reference density d' is calculated by the equation d'/9, thus %=0.66 is obtained.

Figure 9:
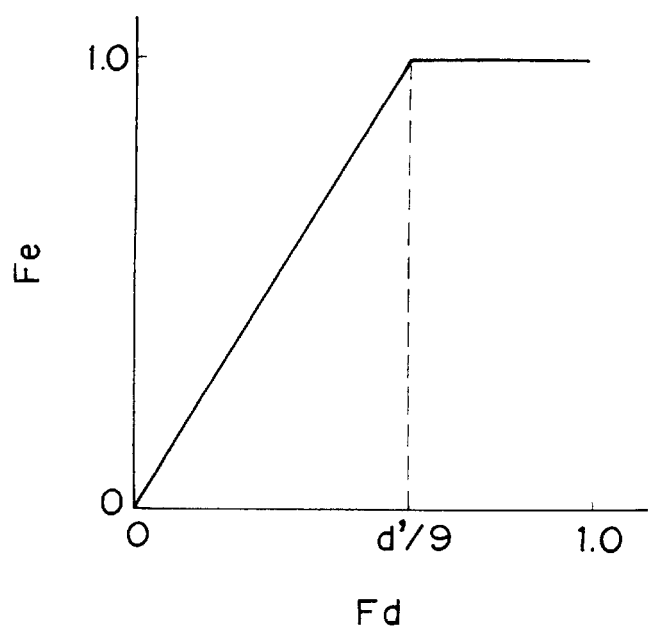
FIG. 9 is a graph showing the gradation correction characteristic of the gradation correction unit shown in FIG. 1.

Referring to FIG. 9, a gradation correction characteristics is show. The micro computer 10 calculates the gradation correction date having the inverse number of the reference density d' as a gain. The gradient of the line extending between two points (0,0) and (d'/9, 1) corresponds to the gain of the gradation correction characteristics and equals to the inverse number of the reference density d'. The input data Fd is on the axis of abscissas, and the output data Fe is on the axis of ordinates in FIG. 9. The scale ranges of abscissas and ordinate axes are normalized between the range of 0.0 to 1.0. When the gradation correction unit 4 having this gradation correction characteristics is used, all of input data Fd which is greater than the reference density d' are output therefrom with the maximum density. Thus, the dynamic range of the output device is fully used, it is possible to prevent the density of the converted font from reducing, resulting in an improvement of the readability thereof. The micro computer 10 set ten integers from 0 to 9 on the axis of abscissa and 8 bit data from 0 to 255 on the axis of ordinate for the gradation correction unit 4. This means that ten entries for characteristic data in 8 bit is set. The micro computer 10 set these data to the gradation correction unit 4 which is comprised of the RAM table 8. Then, the first step for gradation characteristics determination is accomplished.

Second Step: Font Generation Step

Hereinbelow, the font generation step for outputting the multilevel font data to the second data memory 2 is described. While the micro computer 10 outputs the coordinates (n, m) of the second memory 2, the micro computer 10 also controls the first addressing unit 6 to output the address (Xn, Ym), for designating the area of 3×3 pixels, of the first data memory 1 which Xn and Ym are expressed as Xm=3×n and Ym=3×m.

The pixel data Fa from the nine bit address range (Xn, Ym) to (Xn+2, Ym+2) in the first data memory 1 is read out to the bit evaluator 30 of the spatial operator 3. The bit evaluator 30 performs the bit evaluation of the pixel data Fa based on the coefficient data from the coefficient setting unit 31 and outputs the evaluated pixel data Fc to the coefficient adder 32. The coefficient adder 32 adds the evaluated pixel data Fa to produce the multilevel bit data Fd which is output to the gradation correction unit 4 through the signal line D1.

The gradation correction unit 4 corrects the gradation characteristics of the multilevel bit data Fd and produce the gradation corrected multilevel font data Fe having 8 bit information. The gamma correction unit 5 applies the gamma correction to the font data Fe and produces the final multilevel font data Ff. This gamma-corrected font data Ff is then stored to the address (n, m), the second addressing unit 7 outputs, of the second data memory 2. The values of n and Xn are than advanced by 1 and 3, respectively, and this operation is repeated until processing of one line is completed. When processing of this one line is completed, n and Xn are reset to 0, and m and Ym are advanced by 1 and 3, respectively, to process the next line.

Figures 10, 11:
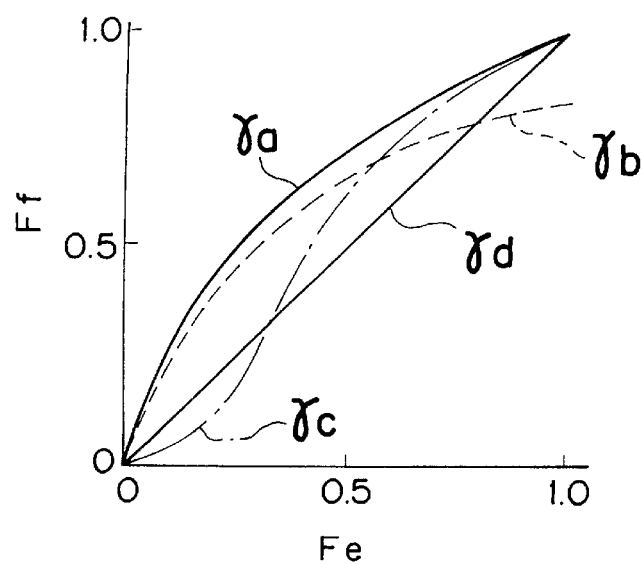
FIG. 10 is a table of density values at each pixel of the font shown in FIG. 4, in which gradation of each pixel is corrected by the gradation correction unit of FIG. 1.
FIG. 11 is a graph showing the typical characteristics employed by the gamma correction unit shown in FIG. 1.

Referring to FIG. 10, the gradation corrected multilevel font data Fe which is the result of the gradation correction of the multilevel font data Fd of FIG. 4 by the gradation correction unit 4 is shown. In FIG. 10, the data are normalized such that the maximum value of the data fall within 1.0. At first step for gradation characteristics determination, the reference density d' is already obtained and is 0.66 in this embodiment, as described before. The first gradation correction unit 4 uses the inverse number of d' (1/0.66) as the gain factor applied in gradation correction of the multilevel font data Fd shown in FIG. 4.

Since the gradation of the density of each cell is made by multiplying the by the inverse number of d' (1/0.66), the density of 0.11 is corrected as expressed by the equation of 0.11×1/0.66=0.17. Similarly, the density of 0.22, 0.33, 0.44, 0.66, and 0.77 of FIG. 4 are corrected to 0.36, 0.50, 0.66, 0.73, and 1.0, respectively, as shown in FIG. 10. As it is clear from the above, the multilevel font data Fd whose maximum density is 0.77 is converted to have a maximum density of 1.0, enabling it to make the best use of the dynamic range of font outputting device.

The gradation correction applied by the gradation correction unit 4 achieves approximately the same effect as increasing the line width of the original binary font data, but can be achieved significantly more easily than any process that may be used to increase the line width of the original binary font data according to the reduction ratio.

The operation of the gamma correction unit 5 is described next. The object of the gamma correction unit 5 is to make the output brightness proportional to the density level of the data output by the spatial operator 3 when the final output of the device according to the present invention is displayed on a CRT or other display device. The gamma correction unit 5 compensates for the various non-linear factors affecting changes in image brightness before the image reaches the eyes, effectively using the information stored in the gradation data to improve readability. These non-linear factors include the specific gamma characteristics of the CRT or video printer, the adjustment of CRT luminance and contrast, and dot gain due to CRT beam or printer dot spreading.

Referring to FIG. 11, characteristics stored in the gamma correction unit 5 are shown. A curve Ya represents a first gamma correction characteristics corresponding to ideal CRT device, and applies a gamma characteristics of $\gamma^{0.45}$ to correct the $\gamma^{2.2}$ characteristic of the CRT. A curve $\gamma b$ represents a second gamma correction characteristics used for CRT devices with a high contrast in which the white level is saturated and gradation characteristics are impaired. A curve $\gamma c$ represents a third gamma correction characteristic effective with CRTs in which luminance is increased so that the luminance can not be completely zero, or due to the reflections off the screen. A curve $\gamma d$ represents a fourth gamma correction characteristic used when linear data is output to other display devices and on liquid-crystal display devices with relatively linear characteristics in which gradation is achieved by frame picking.

Since the gradation correction unit 4 outputs 8-bit font data Fe, the gamma correction unit 5 includes four tables each having two hundred fifty six of 8-bit entries.

Using this gamma correction unit 5, the font output device of the invention can output font information with no loss of pixel density even when the reduction ratio of the source font is high.

In addition, gradated information resulting from variable pixel density font data can be displayed and used in a form offering the maximum readability.

It is to be noted that the present invention is described with reference to the case when the binary source font is reduced at one-third reduction rate, however, it is also possible to apply the device according to the present invention to reduce the source font to ½ or ¼. For example, to reduce the source font to ¼, it is only have to set the units of the font conversion device according to the present invention as described below. The first data memory 1 outputs 16 bit data corresponding to 4×4 pixel area, the coefficient setting unit 31 outputs "1" bit data from the terminals b0 to b15 for bit evaluation by the unit 32. The RAM table 8 includes seventeen tables for obtaining the ogive curve of the pixel data to determine the reference density d'. The gradation correction unit 4 includes seventeen entries for outputting 8-bit font data Fe.

Figure 12:
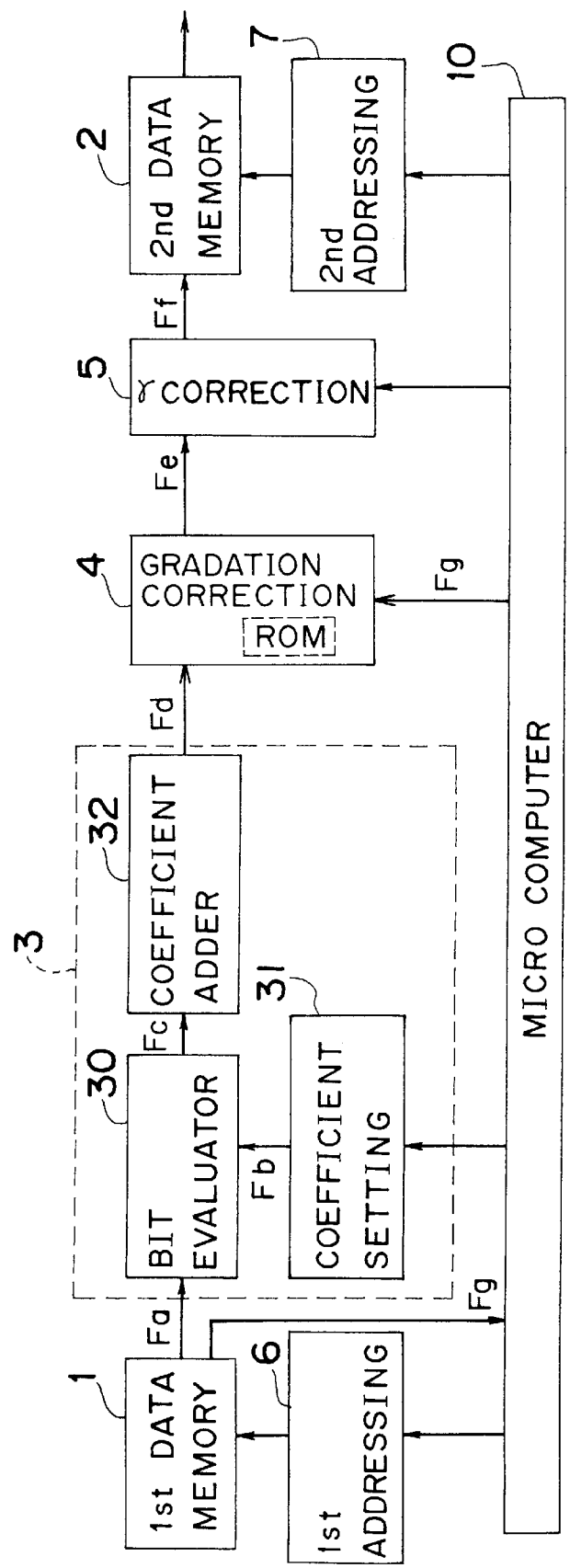
FIG. 12 is a block diagram of an alternation of the font conversion device of FIG. 1.

Referring to FIG. 12, an alternation of the font conversion device of FIG. 1 is shown. It is to be noted that this alternation is essentially the same as the embodiment shown in FIG. 1. What differs is that the RAM table 8 is removed from the spatial operator 3 and the gradation correction unit 4 further includes a ROM storing a plurality of gain characteristics data therein. The micro computer 10 selects suitable gradation correction characteristics stored in the ROM of the gradation correction unit 4 according to the reduction ratio of the binary font data and the typeface expressed by the binary font data, and the correction unit 4 corrects the gain of the multilevel font data Fd. Therefore, the first step of Gradation characteristics determination executed in the device shown in FIG. 1 is not necessary.

Figures 13, 14:
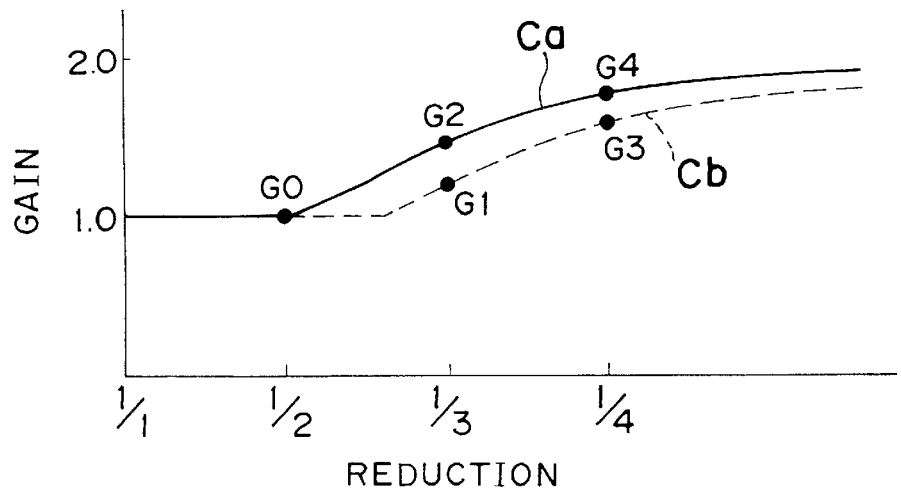
FIG. 13 is an illustrations of assistance in explaining the method to determining the gain employed by the font conversion device of FIG. 12.
FIG. 14 is a table of density values at each pixel of the gradation font reduce at a ½ reduction ratio according to the prior art.

Referring to FIG. 13, characteristics used for character type are shown. On the axis of the abscissas, the reduction ratio is shown, and the gain on the axis of ordinates. A curve Ca represents the characteristic used with a Mincho font which is one kind of Japanese character types, and curve Cb represents the characteristic used with a gothic font.

The selection process for a Mincho font is described first. AS shown in FIG. 13, the gain is set at one when the reduction ratio is from ⅕ to ½, i.e., when drop in density is not much of a problem. By selecting a larger gain of 1.5 or 1.7 when the reduction ratio is increased to ⅓ or ¼, respectively, the loss of density accompanying a high reduction ratio can be prevented.

When a gothic font is selected, the characteristic curve Cb is used. This is because the typical line width in a gothic font is thicker than that in a Mincho font, and the loss of character density is therefore less when output at the same reduction ratio. By thus selecting the gain of the density correction characteristic according to the font typeface, loss of readability caused by the different output densities of the fonts can be prevented when different faces are output to the same screen or device. It is to be noted that the gain is computed for all characters in a font by examining the output density at various reduction ratios. Thus obtained gain data are stored together with the font data in the first data memory 1.

The points G0 to G4 in FIG. 13 indicates the gains at the reduction rations of ½, ⅓, and ¼ for the both fonts. Since the conversion device of the preferred embodiment reduces the source font at three of reduction ratio, ½, ⅓, and ¼, the possible gain to be applied to the multilevel font data Fd is five values according to the points G0 to G4. The first data memory 1 stores the number assigned to the gain values and the types of font data. Since five kinds of gain values is expressed by 3-bit data and the reduction ratio has three values, 9-bit data for each of font types are stored in the first data memory 1. This These information is output from the first data memory 1 as a setting data Fg to the gradation correction unit 4 through the micro computer 10. The gradation correction unit 4 includes ROM tables having five kinds of gradation correction characteristic corresponding to five kinds of gains at points G0 to G4. The gradation correction unit 4 selects either of ROM tables according to the 3-bit signal Fg indicating the number signed to the gain which is outputted by the micro computer 10.

By means of the invention thus described, the loss of character density when the reduction ratio is high can be prevented, and differences in the output density when different typefaces are used at the same time can be eliminated by selecting the gain according to the reduction ratio of the characters and the typeface.

In addition, high precision correction of drops in density is possible in the first embodiment because the gain is determined by surveying the output data from the spatial operator 3. The processing speed can be increased and the construction of the device can be simplified in the second embodiment, however, because the gain is determined by referencing a data table of gain values selected according to the reduction ratio and typeface.

It is to be noted that a reduction ratio of ⅓ has been used in the above descriptions by way of example only, but a continuous range of reduction ratios can be used by defining the filter coefficients at closer intervals and using data interpolation.

In addition, an average value has been used as the operating coefficient of the spatial operator 3 filtration in the above descriptions to clearly show the difference between the prior art and the present invention, but a larger range can be used as the operating area with an appropriate filter. By thus using an even larger filter, a low-pass filter with even better bandwidth limitation characteristics can be achieved, and font data with even better readability can be obtained. In such a low-pass filter, each of coefficient values therein are usually different. It is possible to use such low-pass filter with the font conversion device in which the coefficient setting unit 30 outputs "1" bit of coefficient data each from the terminals b0 to b15 by setting the each components thereof, as follows: To output a 8-bit data each from the terminals b0 to b15; To construct each of current AND-gates corresponding to each pixel by eight of AND-gates for receiving 8-bit data.

Furthermore, the gamma correction unit 5 is described using with a ROM table, but a RAM table in which the characteristics curves are written by the microcomputer 10 can be alternatively used. A direct hardware configuration by means of function approximation is also possible.

As the binary source font, any other binary source fonts other than that of 24×24 dot, for example a plurality of dot sizes, can be employed.

The binary source font data is also described as stored in a font ROM, but it is also possible for the first data memory 1 to be a RAM device used to store binary font data generated by a vector font generator.

When using the vector font, if the source font having greater size is stored in the RAM, it is possible to obtain the mutilevel font data having better gradational characteristics by setting the reduction ratio properly. For example, in the present invention, the binary source font of 24×24 dot is reduced at a reduction ratio of one-third, and then the 8×8 pixel font having ten of gradation levels (based on bit signals form terminals b0 to b9) are obtained. However, when a binary vector font of 48×48 dot generated by the vector font generator is reduced at a ratio of ⅙, a multilevel font data of 8×8 pixel having thirty seven levels which is calculated as 6×6+1 is obtained. From this, it is apparent that the combination of the present invention and the vector font generator can provides the multilevel font data having a smoother gradational characteristics. This can be explained that the binary source vector font data of 48×48 dot has much more information than that of the non-vector font of 24×24 dot, which contributes more gradational information to the reduced vector font compared with non-vector font which is reduced to the same size.

From this, it is possible to determine the pixel size of the binary source font generated by the vector generator based on the font size of finally output and the possible number of gradation of the font outputting unit. One example is described herebelow. It is assumed that as an output device, a LCD display having a liner gamma characteristics and display 16 gradation is used for the convenience of the explanation. To output a multilevel font data of, for example, 8×8 dot with 16 gradation to the LCD display, a font of 32×32 pixel is enough for the binary font data. This is because that sixteen levels of multilevel image data can be obtained by reducing the binary source font at the reduction ratio of the inverse number of square route of sixteen, as described before.

Since the gamma characteristics of the LCD display in the above example is assumed to be liner, the bit accuracy after gamma correction is not degraded. However, it is necessary to consider the bit drop due to the gamma correction by the gamma correction unit 5 in an actual use. Therefore, when the final output font having sixteen levels is needed, the gradation correction unit 4 needs the input data having gradation more tan sixteen level. In other words, it is only have to generate a binary font data of greater than 32×32 pixel. The gradation number of input data actually need is determined based on the gamma characteristics of the gamma correction unit 5.

The gradation font date is also stored to an image memory, but it can also be stored to an external storage device that performs an equivalent function.

In addition, the output device is not limited to a CRT or other video display, and a video printer that is capable of printing gradation images by applying ink: to a recording medium can also be used.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A font conversion device for converting a first font formed of a first plurality of pixels each having a binary value, to a second font, smaller than said first font, formed of a second plurality of pixels, each having a multilevel value, said device comprising:
   source font means for providing font data; corresponding to said first plurality of pixels in respective regions of said first font;

spatial operation means for reducing said font data by applying a low pass filtering to said font data read out from said respective regions of said first font to produce a plurality of multilevel-value font data having a first dynamic range, each of said multilevel-value font data corresponding to a respective one of said second plurality of pixels; and a gradation correction means for applying a predetermined gain to said plurality of multilevel-value data to produce each multilevel value with a second dynamic range larger and with a greater maximum value than said first dynamic range.

2. A font conversion device as claimed in claim 1, wherein said predetermined gain is greater than the inverse number of the maximums of said plurality of multilevel-value font data.

3. A font conversion device as claimed in claim 1, further comprising a gamma correction means for correcting said multilevel-value font data, said gamma correction means setting a gamma correction characteristics desirable to the gradation characteristics of the font outputting device.

4. A font conversion device as claimed in claim 1, wherein said gradation correction means comprising a ROM table storing plural input/output characteristics therein.

5. A font conversion device as claimed in claim 4, further comprising a gradation characteristics setting means for setting the input/output characteristics of said gradation correction means.

6. A font conversion device as claimed in claim 5, wherein said gradation characteristics setting means examines the distribution of said multilevel-value data and sets desirable input/output characteristics based on the result of said examination.

7. A font conversion device as claimed in claim 6, wherein said gradation characteristics setting means sets the input/output characteristics corresponding to the result of said examination applied to all characters of said binary source font.

8. A font conversion device as claimed in claim 5, wherein said gradation characteristics setting means sets the input/output characteristics based on said predetermined reduction rate.

9. A font conversion device as claimed in claim 5, wherein said gradation characteristics setting means sets the input/output characteristics based on the typeface of said multilevel-value data.

10. A font conversion device as claimed in claim 1, wherein said gradation correction means comprising a RAM table being able to receive a plural input/output characteristics provided by said control means.

11. A font conversion device as claimed in claim 1, further comprising a vector font rasterizing means for generating said binary font data from a vector font data.

12. A font conversion device as claimed in claim 11, wherein said vector font rasterizing means generates said binary font data having a font size greater than the pixel area defined by (kk×n)×(kk×n), in which the font size finally output is expressed by n×n pixels, the number of gradation levels of said binary font data input is k, and square root of k is kk.

13. A font conversion device as claimed in claim 1, wherein said source font means is comprised of a font ROM for storing said binary font data therein.

14. A font conversion device as claimed in claim 13, wherein said font ROM further stores at least information of gradation correction characteristics, and said device further includes a gradation characteristics setting means for setting the characteristics of said gradation correction means based on said information.

15. A font conversion device as claimed in claim 1, further comprising a gradation characteristics setting means for setting the input/output characteristics of said gradation correction means.

16. A font conversion device as claimed in claim 1, wherein said predetermined gain is one or greater.

17. A font conversion device for converting a binary font data formed by pixels, said pixels having a binary value, by applying a bandwidth limitation according to a predetermined reduction rate, into a reduced font data formed by pixels each having multilevel values for display on an output device having a first dynamic range, said device comprising:

source font means for sequentially providing font data of predetermined areas of said binary font data, said predetermined area including a predetermined number of pixels;

spatial operation means for reducing said binary font data by applying a low pass filtering to said binary font data read out from said predetermined areas to produce a plurality of multilevel-value font data, each of said multilevel-value font data representing a single pixel of said reduced font data; and gradation correction means for applying a gain to said plurality of multilevel-value data to produce an enhanced font data having a second dynamic range larger and with a greater maximum value than said first dynamic range, said gain related to the first dynamic range of the output device; and control means for controlling each means of said font conversion device.

18. A font conversion device for converting a first font formed of a first plurality of pixels each having a binary value, to a second font, smaller than said first font, formed of a second plurality of pixels, each having a multilevel value, said device comprising:

a first memory for providing font data; corresponding to said first plurality of pixels in respective regions of said first font;

a low pass filter for reducing said font data read out from said respective regions of said first font to produce a plurality of multilevel-value font data having a first dynamic range, each of said multilevel-value font data corresponding to a respective one of said second plurality of pixels; and a gradation corrector for applying a predetermined gain to said plurality of multilevel-value data to produce each multilevel value with a second dynamic range larger and with a greater maximum value than said first dynamic range.

19. A method for converting a first font formed of a first plurality of pixels to a second font smaller than said first font formed of a second plurality of pixels, said method comprising the steps of:

providing font data corresponding to said first plurality of pixels in respective regions of said first font;

reducing said font data to produce a plurality of multilevel-value font data having a first dynamic range, each of said multilevel-value font data corresponding to a respective one of said second plurality of pixels; and applying a predetermined gain to said plurality of multilevel-value data to produce each multilevel-value with a second dynamic range larger and with a greater maximum value than said first dynamic range.

20. The method of claim 19, wherein said first plurality of pixels each have a binary value and wherein said second plurality of pixels each have a multilevel-value.

* * * * *